US011418733B2

(12) United States Patent
Takado

(10) Patent No.: US 11,418,733 B2
(45) Date of Patent: Aug. 16, 2022

(54) IMAGING DEVICE AND IMAGING SYSTEM

(71) Applicant: CANON KABUSHIKI KAISHA, Tokyo (JP)

(72) Inventor: Hisashi Takado, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/474,328

(22) Filed: Sep. 14, 2021

(65) Prior Publication Data

US 2022/0094867 A1    Mar. 24, 2022

(30) Foreign Application Priority Data

Sep. 18, 2020 (JP) .............................. JP2020-157440

(51) Int. Cl.
*H04N 5/355* (2011.01)
*H04N 5/3745* (2011.01)
*H04N 5/378* (2011.01)

(52) U.S. Cl.
CPC ....... *H04N 5/35581* (2013.01); *H04N 5/3559* (2013.01); *H04N 5/37452* (2013.01); *H04N 5/378* (2013.01)

(58) Field of Classification Search
CPC ............. H04N 5/35581; H04N 5/3559; H04N 5/37452; H04N 5/378; H04N 5/2355
See application file for complete search history.

(56) References Cited

U.S. PATENT DOCUMENTS

| 8,314,852 | B2 * | 11/2012 | Nagata | H04N 5/232945 |
| | | | | 348/297 |
| 9,900,532 | B2 | 2/2018 | Takado | |
| 9,900,535 | B2 | 2/2018 | Takado | |
| 9,912,886 | B2 | 3/2018 | Shigeta | |
| 10,044,992 | B2 | 8/2018 | Takado | |
| 10,122,951 | B2 | 11/2018 | Takado | |
| 10,244,192 | B2 | 3/2019 | Shigeta | |
| 10,477,165 | B2 | 11/2019 | Takado | |
| 10,645,325 | B2 | 5/2020 | Takado | |
| 10,979,647 | B2 * | 4/2021 | Takado | H04N 5/3559 |
| 11,057,582 | B2 | 7/2021 | Takado | |
| 11,159,759 | B2 | 10/2021 | Takado | |
| 2016/0330414 | A1 | 11/2016 | Takado | |

(Continued)

FOREIGN PATENT DOCUMENTS

JP    2011-4089 A    1/2011

*Primary Examiner* — Nhan T Tran
(74) *Attorney, Agent, or Firm* — Venable LLP

(57) ABSTRACT

An imaging device includes a pixel unit including pixels arranged in rows and columns, a pixel control unit that outputs, from each pixels, a first signal based on a charge generated during a first exposure period and a second signal based on a charge generated during a second exposure period, and an exposure time determination processing unit that determines a length of the second exposure period based on the first signal. The pixel unit includes areas each including at least one pixel, the exposure time determination processing unit determines the length of the second exposure period in each areas based on the first signal in each areas, and the pixel control unit starts the second exposure period in the pixels in a first area after outputting the first signal from the pixels in the first area and before outputting the first signal from the pixels in a second area.

14 Claims, 13 Drawing Sheets

(56) References Cited

U.S. PATENT DOCUMENTS

2020/0137286 A1* 4/2020 Takado ................ H04N 5/3559
2020/0252570 A1    8/2020 Sekine
2020/0314369 A1* 10/2020 Yamanaka ............. H04N 5/353
2021/0258529 A1*  8/2021 Arishima .......... H01L 27/14609

* cited by examiner

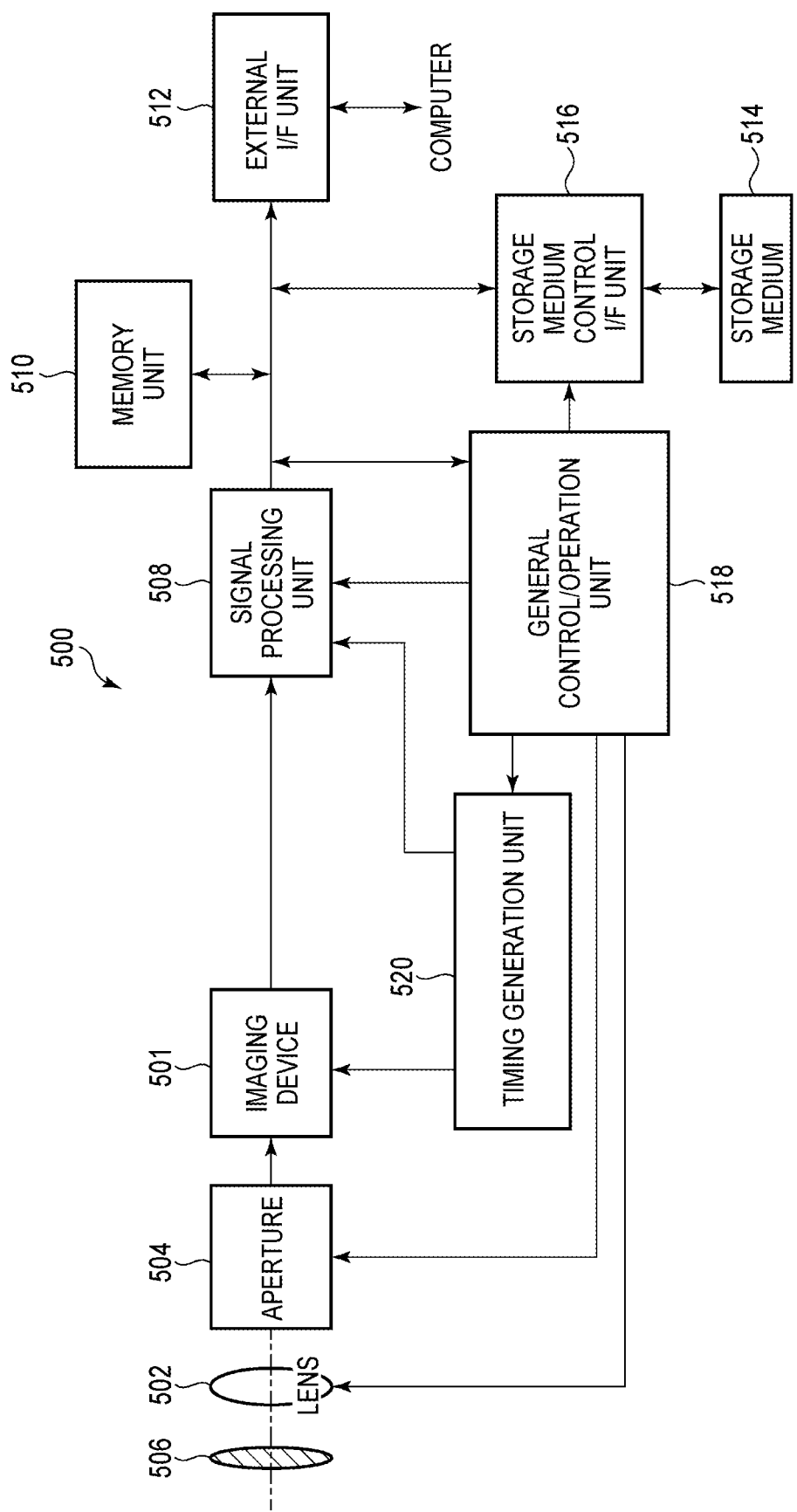

IMAGING DEVICE AND IMAGING SYSTEM

BACKGROUND OF THE INVENTION

Field of the Invention

The present invention relates to an imaging device and an imaging system.

Description of the Related Art

There is known a technique for acquiring an image having a wide dynamic range by performing photographing by setting an exposure time for each of a plurality of areas set in a pixel unit and performing image processing on the acquired data to restore the image. Japanese Patent Application Laid-Open No. 2011-004089 describes a technique in which preliminary shooting is performed to create an exposure map, and the exposure time of each area is controlled based on the created exposure map.

However, in the imaging device described in Japanese Patent Application Laid-Open No. 2011-004089, since a time lag occurs between the decision of the exposure time and the actual imaging, reduction in frame rate cannot be avoided when a moving image is taken. Further, when a moving object is taken, a deviation occurs between the imaging condition at the time of preliminary imaging and the imaging condition at the time of actual imaging, and the exposure condition at the time of actual imaging may not be optimized.

SUMMARY OF THE INVENTION

An object of the present invention is to provide an imaging device capable of acquiring a high quality and high dynamic range image without impairing a frame rate.

According to an aspect of the present invention, provided is an imaging device including a pixel unit in which a plurality of pixels each including a photoelectric converter are arranged in a plurality of rows and a plurality of columns, a pixel control unit configured to control the plurality of pixels to output, from each of the plurality of pixels, a first signal based on a charge generated in the photoelectric converter during a first exposure period and a second signal based on a charge generated in the photoelectric converter during a second exposure period having a length different from that of the first exposure period; and an exposure time decision processing configured to decide a length of the second exposure period based on the first signal, wherein the pixel unit includes a plurality of areas each including at least one pixel, wherein the exposure time decision processing unit is configured to decide a length of the second exposure period in each of the plurality of areas based on the first signal in each of the plurality of areas, and wherein the pixel control unit is configured to start the second exposure period in the pixels of a first area of the plurality of areas in one frame after the first signal is output from the pixels of the first area in the one frame and before the first signal is output from the pixels of a second area of the plurality of areas in the one frame.

Further features of the present invention will become apparent from the following description of exemplary embodiments with reference to the attached drawings.

BRIEF DESCRIPTION OF THE DRAWINGS

FIG. 12 is a block diagram illustrating a general configuration of an imaging system according to a third embodiment of the present invention.

DESCRIPTION OF THE EMBODIMENTS

Preferred embodiments of the present invention will now be described in detail in accordance with the accompanying drawings.

First Embodiment

Figure 1:
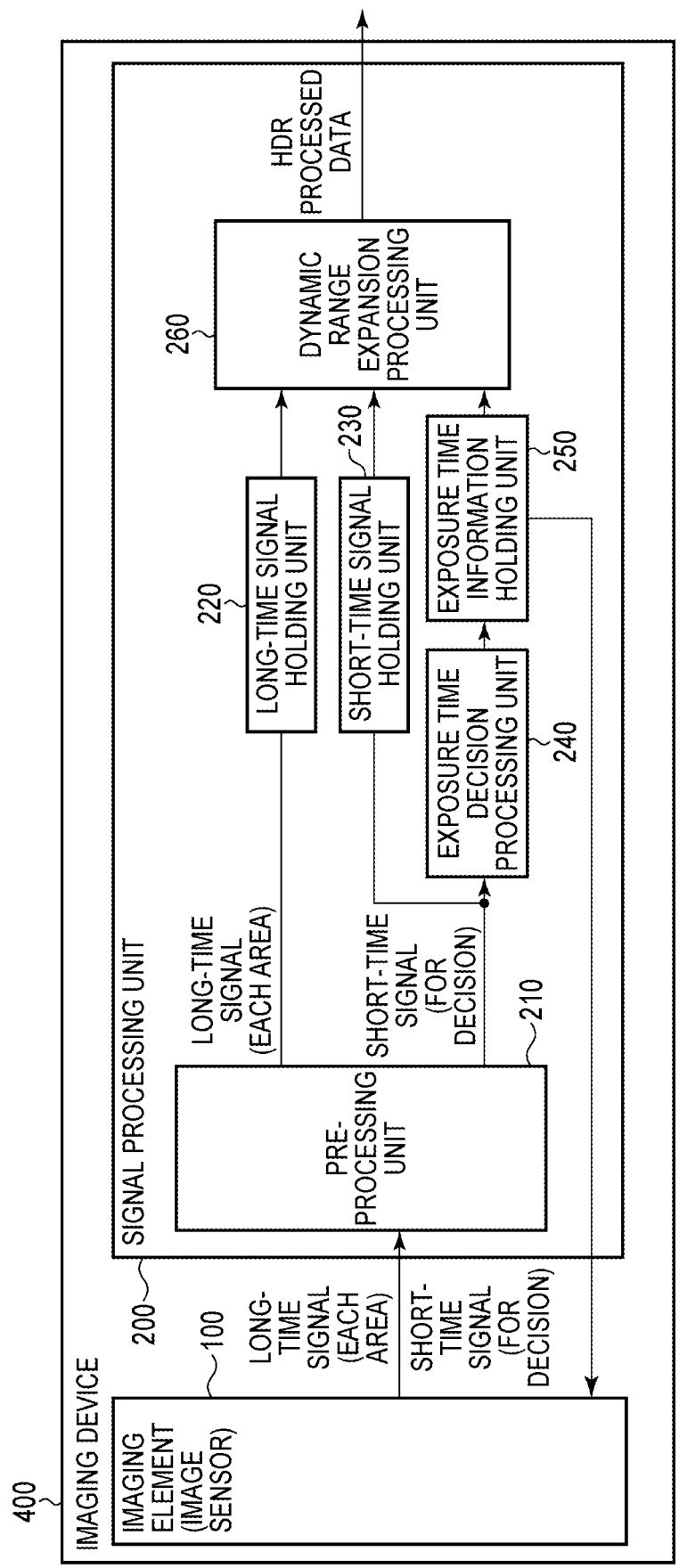
FIG. 1 is a block diagram illustrating a general configuration of an imaging device according to a first embodiment of the present invention.
Figure 2:
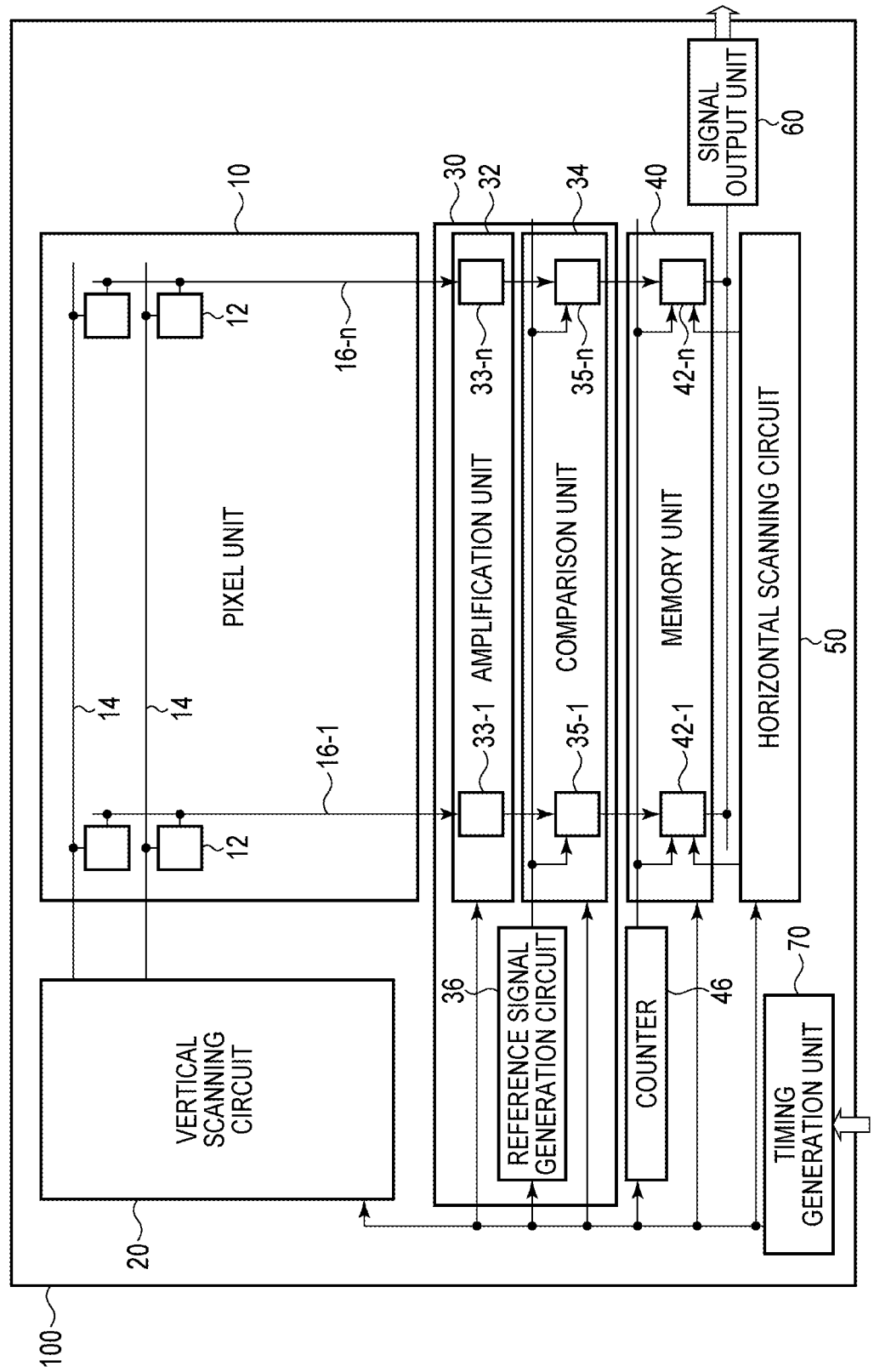
FIG. 2 is a block diagram illustrating a general configuration of an imaging element in the imaging device according to the first embodiment of the present invention.
Figure 3:
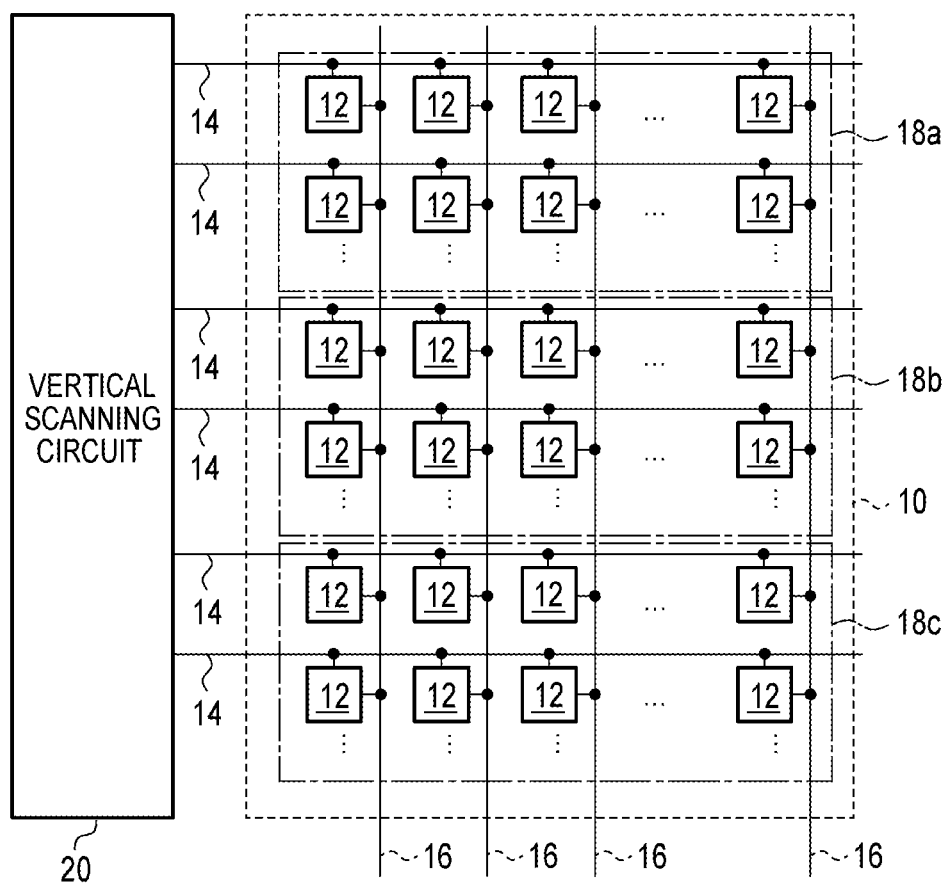
FIG. 3 is a diagram illustrating an area defined by a pixel unit of the imaging element in the imaging device according to the first embodiment of the present invention.
Figure 4:
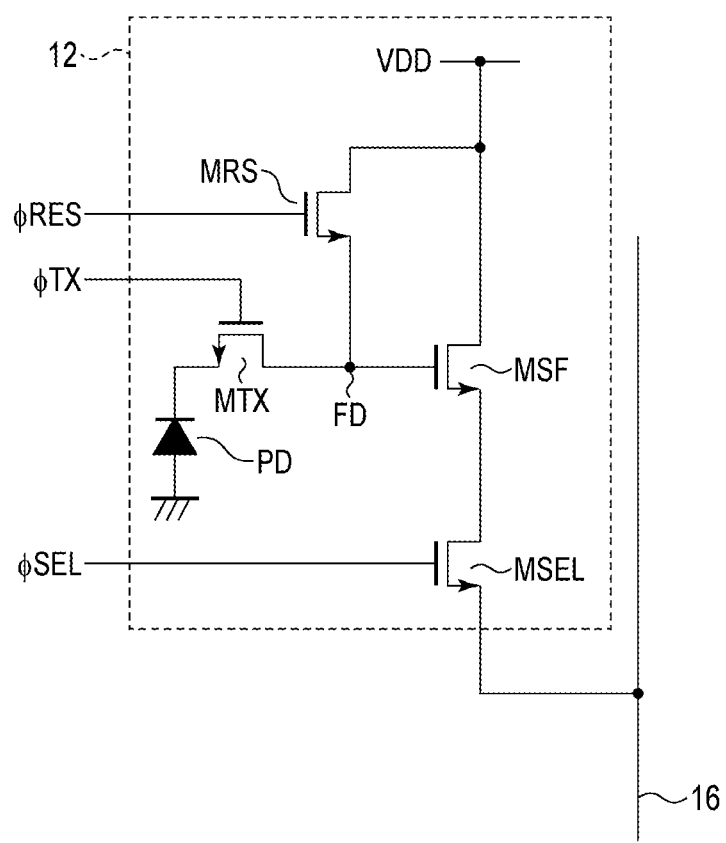
FIG. 4 is a circuit diagram illustrating a configuration example of pixels of the imaging element in the imaging device according to the first embodiment of the present invention.

A configuration example of an imaging device according to a first embodiment of the present invention will be described with reference to FIG. 1 to FIG. 4. FIG. 1 is a block diagram illustrating a general configuration of an imaging device according to the present embodiment. FIG. 2 is a block diagram illustrating a general configuration of an imaging element in the imaging device according to the present embodiment. FIG. 3 is a diagram illustrating an area defined in a pixel unit of the imaging element in the imaging device according to the present embodiment. FIG. 4 is a circuit diagram illustrating a configuration example of pixels of the imaging element in the imaging device according to the present embodiment.

As illustrated in FIG. 1, the imaging device 400 according to the present embodiment includes an imaging element 100 and a signal processing unit 200. The signal processing unit 200 may include a pre-processing unit 210, a long-time signal holding unit 220, a short-time signal holding unit 230, an exposure time decision processing unit 240, an exposure time information holding unit 250, and a dynamic range expansion processing unit 260.

The imaging element 100 converts an optical signal (object image) incident via an optical system (not illustrated) into an electric signal and outputs the electric signal. The imaging element 100 may be configured by, for example, a so-called single-chip type color sensor in which color filters (hereinafter, also referred to as "CF") are disposed on a CMOS image sensor or a CCD image sensor. The imaging element 100 is not necessarily a color sensor, and may be a monochrome sensor.

The imaging element 100 includes a plurality of pixels each including a photoelectric converter. Each of the plurality of pixels outputs a first signal based on the charge generated during a first exposure period and a second signal based on the charge generated during a second exposure period whose length is different from that of the first exposure period. In the following explanation, a signal based on charge generated during a relatively short exposure time (first exposure period) may be referred to as a "short-time signal", and a signal based on charge generated during a relatively long exposure time (second exposure period) may be referred to as a "long-time signal".

The pre-processing unit 210 performs pre-processing of signal processing on the output signal from the imaging element 100. When the output signal from the imaging element 100 is an analog signal, analog-to-digital conversion (A/D conversion) processing on the output signal of the imaging element 100 may be performed by the pre-processing unit 210. The pre-processing unit 210 appropriately performs correction (pre-processing) such as offset (OFFSET) correction, gain (GAIN) correction, and the like on the output signal (input signal Din) of the imaging element 100 to generate a corrected output signal (data Dout). This process is typically expressed by the following equation (1).

$$Dout=(Din-OFFSET)\times GAIN \quad (1)$$

The correction in the pre-processing unit 210 may be performed for each of various units. For example, correction is performed for each pixel, correction is performed for each column amplifier, correction is performed for each analog-to-digital converter (ADC) unit, correction is performed for each output amplifier, and the like. By correcting the output signal of the imaging element 100, so-called fixed pattern noise may be reduced, and a higher-quality image may be obtained.

The pre-processing unit 210 performs the above-described pre-processing on each of the long-time signal and the short-time signal output from the imaging element 100, separates the processed long-time signal and short-time signal, and transmits them to the post-processing unit. Specifically, the pre-processing unit 210 transmits the processed long-time signal to the long-time signal holding unit 220, and transmits the processed short-time signal to the exposure time decision processing unit 240 and the short-time signal holding unit 230. The long-time signal holding unit 220 holds the long-time signal received from the pre-processing unit 210. The short-time signal holding unit 230 holds the short-time signal received from the pre-processing unit 210.

The exposure time decision processing unit 240 performs an exposure time decision process on the short-time signal received from the pre-processing unit 210, and decides the timing of shutter scan for deciding the exposure time for the long-time signal. The method of deciding the exposure time is not particularly limited, and may be, for example, photometry processing for performing automatic exposure adjustment. For example, based on the relationship between the exposure time for the short-time signal and the signal level of the short-time signal, the exposure time for the long-time signal may be decided such that a long-time signal having highest possible level is obtained without being saturated.

The decision of the exposure time may be made based on the average value of the short-time signals, or may be made by analyzing the frequency distribution of the signal values of the short-time signals. The exposure time decision processing unit 240 transmits, to the exposure time information holding unit 250, information (exposure time information) related to the exposure time for the long-time signal decided by the decision of the short-time signal. The exposure time information holding unit 250 holds the exposure time information received from the exposure time decision processing unit 240.

In the imaging device 400 according to the present embodiment, a plurality of areas are defined in a pixel area (a pixel unit 10 described later) of the imaging element 100. The exposure time decision processing unit 240 acquires information related to the exposure time for the long-time signal for each of the plurality of areas. The exposure time information holding unit 250 holds information related to the exposure time for the long-time signal in each of the plurality of areas.

The timing at which a long-time signal is output from the same pixel is different from the timing at which a short-time signal is output. Moreover, the timing at which the exposure time information is output from the exposure time decision processing unit 240 is different from the timing at which the long-time signal is output and the timing at which the short-time signal is output. The long-time signal holding unit 220, the short-time signal holding unit 230, and the exposure time information holding unit 250 are memories that temporarily hold the long-time signal, the short-time signal, and the exposure time information in order to simultaneously output the long-time signal, the short-time signal, and the exposure time information to a subsequent processing unit.

The long-time signal holding unit 220, the short-time signal holding unit 230, and the exposure time information holding unit 250 are not particularly limited, but may be configured by, for example, line memories for ten rows formed by SRAM.

The dynamic range expansion processing unit 260 performs processing for obtaining image data having a wide dynamic range using the long-time signal and the short-time signal acquired by the imaging element 100 and the exposure time information of each area received from the exposure time information holding unit 250. A specific configuration and operation of the dynamic range expansion processing unit 260 will be described later.

As illustrated in FIG. 2, the imaging element 100 includes a pixel unit 10, a vertical scanning circuit 20, a readout circuit unit 30, a memory unit 40, a counter 46, a horizontal scanning circuit 50, a signal output unit 60, and a timing generation circuit 70.

The pixel unit 10 is provided with a plurality of pixels 12 arranged in matrix over a plurality of rows and a plurality of columns. In the pixel unit 10, for example, 1920 pixels are arranged in the column direction, 1080 pixels are arranged in the row direction, and a total of 2073600 pixels are arranged. The number of pixels arranged in the pixel unit 10 is not limited, and may be larger or smaller.

In each row of the pixel unit 10, a control line 14 is arranged so as to extend in a first direction (a lateral direction in FIG. 2). Each of the control lines 14 is connected to the pixels 12 aligned in the first direction, and forms a signal line common to these pixels 12. The first direction in which the control lines 14 extend may be referred to as a row direction or a horizontal direction.

Vertical signal lines 16 are arranged in each column of the pixel unit 10 so as to extend in a second direction (vertical direction in FIG. 2) intersecting the first direction. Each of the vertical signal lines 16 is connected to the pixels 12 aligned in the second direction, and forms a signal line common to these pixels 12. The second direction in which the vertical signal lines 16 extend may be referred to as a column direction or a vertical direction.

In FIG. 2, it is assumed that the pixel unit 10 includes pixels 12 of n number of columns from the first column to the n-th column, and column numbers are referred as the reference numerals of the vertical signal lines 16 of the respective columns. For example, the vertical signal lines 16 in the first column are denoted by "16-1", and the vertical signal lines 16 in the n-th column are denoted by "16-n". In the following explanation, a similar notation is used for elements provided corresponding to the columns of the pixel unit 10.

The control lines 14 in each row are connected to the vertical scanning circuit 20. The vertical scanning circuit 20 is a control unit that supplies a control signal for driving the readout circuit in the pixel 12 to the pixel 12 in row units via the control line 14 when the pixel signal is read out. The pixel signals of the pixels 12 belonging to the row (selected row) selected by the control signal supplied from the vertical scanning circuit 20 are simultaneously output to the vertical signal lines 16 of the columns corresponding to the pixels 12. In the present embodiment, the vertical scanning circuit 20 is a pixel control unit that controls the plurality of pixels 12 so as to output a short-time signal and a long-time signal from each of the plurality of pixels 12.

The vertical signal lines 16 in each column are connected to the readout circuit unit 30. The readout circuit unit 30 includes an amplification unit 32, a comparison unit 34, and a reference signal generation circuit 36. The amplification unit 32 includes n number of amplifiers 33-1 to 33-n provided corresponding to the respective columns of the pixel unit 10. The amplifiers 33-1 to 33-n amplify pixel signals output from the pixels 12 via the vertical output lines 16-1 to 16-n of the corresponding columns. The comparison unit 34 includes n number of comparators 35-1 to 35-n provided corresponding to the respective columns of the pixel unit 10. The comparators 35-1 to 35-n compare the levels of the pixel signals output from the amplifiers 33-1 to 33-n in the corresponding columns with the levels of the reference signals output from the reference signal generation circuit 36, and output comparison results.

The memory unit 40 includes n number of memories 42-1 to 42-n provided corresponding to the respective columns of the pixel unit 10. The memories 42-1 to 42-n receive signals output from the comparators 35-1 to 35-n in the corresponding columns, latch and hold count signals output from the counter 46 in response to the received signals. The reference signal output from the reference signal generation circuit 36 is a signal whose signal level changes at a constant rate in dependent of time. The count signals held in the memories 42-1 to 42-n correspond to digital pixel signals obtained by AD conversion of analog pixel signals output from the pixels 12.

The horizontal scanning circuit 50 is a control unit that supplies a control signal for sequentially selecting memories 42-1 to 42-n in each column of the memory unit 40 to the memory unit 40. The memories 42-1 to 42-n that have received the control signals from the horizontal scanning circuit 50 transfer the digital pixel signals held therein to the signal output unit 60. The signal output unit 60 performs predetermined digital signal processing on the digital pixel signals of the respective columns transferred from the memory unit 40, and outputs the digital pixel signals to the outside of the imaging element 100.

The timing generation circuit 70 is a circuit unit for supplying control signals for controlling operations and timings of the vertical scanning circuit 20, the readout circuit unit 30, the memory unit 40, the horizontal scanning circuit 50, and the like. Part or all of the control signals supplied to the vertical scanning circuit 20, the readout circuit unit 30, the memory unit 40, the horizontal scanning circuit 50, and the like may be supplied from the outside of the imaging element 100.

A plurality of areas independent from each other are defined in the pixel unit 10. In the imaging device 400 of the present embodiment, the plurality of areas are defined by rows of the pixel unit 10, and each of the plurality of areas includes at least one row. FIG. 3 illustrates a case where three areas 18a, 18b, and 18c are defined in the pixel unit 10. The number of areas defined in the pixel unit 10 is not particularly limited. The number of pixel rows included in each area is not particularly limited. For example, all of the plurality of areas may include the same number of pixel rows, or at least two of the plurality of areas may include different numbers of pixel rows.

The vertical scanning circuit 20 may perform shutter scan individually for each of the areas 18a, 18b, and 18c. That is, the vertical scanning circuit 20 may perform shutter scan for each of the areas 18a, 18b, and 18c and adjust the exposure time for each of the areas 18a, 18b, and 18c. Note that shutter scan refers to an operation in which reset (shutter operation) of the photoelectric converters of the pixels 12 is sequentially performed row by row basis.

As illustrated in FIG. 4, each pixel 12 may include a photodiode PD, a transfer transistor MTX, a reset transistor MRS, an amplifier transistor MSF, and a select transistor MSEL. The photodiode PD has an anode connected to the reference voltage node and a cathode connected to the source of the transfer transistor MTX. The drain of the transfer transistor MTX is connected to the source of the reset transistor MRS and the gate of the amplifier transistor MSF. A connection node between the drain of the transfer transistor MIX, the source of the reset transistor MRS, and the gate of the amplifier transistor MSF is a so-called floating diffusion FD. The floating diffusion FD includes a capacitance component, functions as a charge holding unit, and constitutes a charge-voltage conversion unit including the capacitance component. The drain of the reset transistor MRS and the drain of the amplifier transistor MSF are connected to a power supply voltage node (voltage VDD). The source of the amplifier transistor MSF is connected to the drain of the select transistor MSEL. The source of the select transistor MSEL, which is also the output node of the pixel 12, is connected to the vertical signal line 16.

The photodiode PD is a photoelectric converter that generates electric charges corresponding to the amount of incident light. When the optical image of the object enters the pixel unit 10, the photodiode PD of each pixel 12 converts the incident light into an amount of charge corresponding to the amount of light (photoelectric conversion)

and accumulates the generated charge. When the transfer transistor MTX is turned on, the charge held by the photodiode PD is transferred to the floating diffusion FD. The floating diffusion FD has a voltage corresponding to the amount of charge transferred from the photodiode PD by charge-voltage conversion by the capacitance component. The amplifier transistor MSF has a configuration in which a voltage VDD is supplied to a drain thereof and a bias current is supplied to a source thereof from a current source (not illustrated) via the select transistor MSEL, and constitutes an amplification unit (source follower circuit) having a gate as an input node. Thus, the amplifier transistor MSF outputs a signal based on the voltage of the floating diffusion FD to the vertical signal line 16 via the select transistor MSEL. The reset transistor MRS is turned on to reset the floating diffusion FD to a voltage corresponding to the voltage VDD. The reset transistor MRS and the transfer transistor MTX simultaneously turn on to reset the photodiode PD to a voltage corresponding to the voltage VDD.

In the case of the pixel 12 having the circuit configuration illustrated in FIG. 4, the control line 14 in each row includes a signal line connected to the gate of the transfer transistor MTX, a signal line connected to the gate of the reset transistor MRS, and a signal line connected to the gate of the selection transistor MSEL. A control signal φTX is supplied to the transfer transistor MTX from the vertical scanning circuit 20 via the control line 14. The reset transistor MRS is supplied with a control signal φRES from the vertical scanning circuit 20 via the control line 14. A control signal φSEL is supplied to the select transistor MSEL from the vertical scanning circuit 20 via the control line 14. The plurality of pixels 12 in the pixel unit 10 are controlled in row basis by control signals φTX, φRES, and φSEL supplied from the vertical scanning circuit 20. When each transistor of the pixel 12 is formed of an n-channel transistor, the corresponding transistor is turned on when these control signals are at High level (H level), and the corresponding transistor is turned off when these control signals are at Low level (L level).

Figure 5:
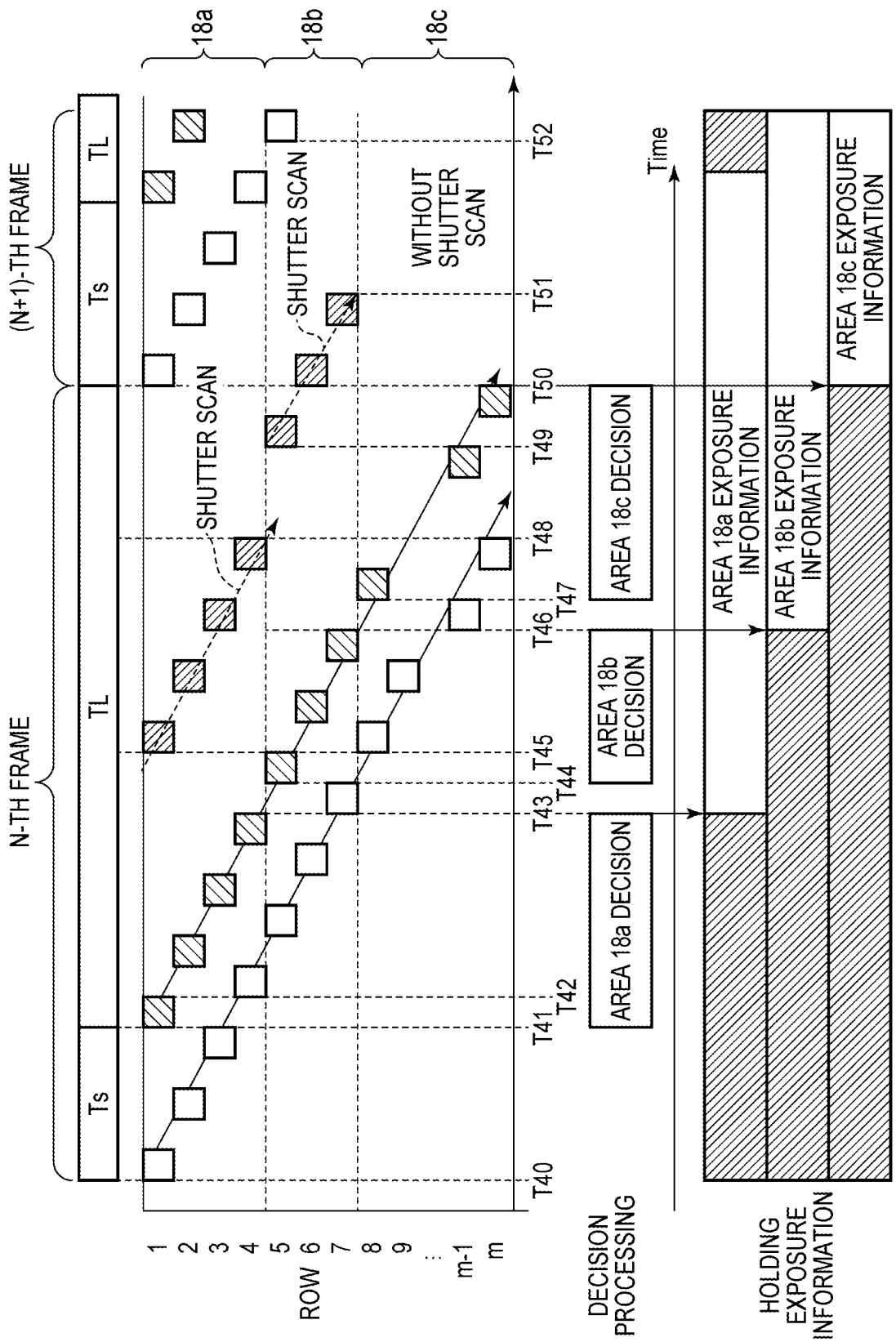
FIG. 5 is a timing chart illustrating an operation of the imaging element in the imaging device according to the first embodiment of the present invention.

Next, the operation timing of the imaging element 100 in the imaging device 400 according to the present embodiment will be described with reference to FIG. 5. FIG. 5 is a timing chart illustrating the operation of the imaging element in the imaging device of the present embodiment. In order to simplify the description, FIG. 5 illustrates a case where the area 18a is constituted by four rows from the first row to the fourth row, the area 18b is constituted by three rows from the fifth row to the seventh row, and the area 18c is constituted by (m-7) rows from the eighth row to the m-th row.

As illustrated in FIG. 5, the imaging element 100 performs line interleaving driving in which a readout operation of a long-time signal and a readout operation of a short-time signal are alternately performed on a row-by-row basis during one frame.

The signal readout operation in a certain frame (the N-th frame) is performed during a period from the time T40 to the time T50, for example, as illustrated in FIG. 5. The time T40 is the time at which the readout operation of the long-time signal of the pixel 12 in the first row in the frame starts. The readout operation of the long-time signal from the pixels 12 in the second row and the subsequent rows is sequentially performed at a predetermined interval for each row.

The period from the time when the readout operation of the long-time signal is finished to the time when the next readout of the signal (short-time signal) is performed is the exposure period for the short-time signal. For example, in the pixels 12 in the first row, the exposure time for the short-time signal is a time corresponding to the length of the period from the time T40 to the time T41. In FIG. 5, an exposure period for the short-time signal in the pixels 12 in the first row is illustrated as a period Ts.

The readout operation of the short-time signal of the pixel 12 in the first row is started at the time T41 after the predetermined exposure time has elapsed and after the readout operation of the long-time signal of the pixel 12 in the third row has ended, for example. The operation of reading the long-time signal from the pixels 12 in the fourth row is started at the time T42 after the end of the operation of reading the short-time signal from the pixels 12 in the first row.

In this manner, after the time T41, the readout operation of the long-time signal and the short-time signal is alternately performed on a row basis in the order of the readout of the short-time signal of the pixel 12 in the first row, the readout of the long-time signal of the pixel 12 in the fourth row, the readout of the short-time signal of the second row, and the readout of the long-time signal of the fifth row. When the readout operation of the short-time signal of the pixel 12 in the m-th row which is the last row is completed, the readout operation of the frame is completed. A period from the time T40 to the time T48 is a period of readout scan in which a long-time signal is read from the pixels 12 in each row. A period from the time T41 to the time T50 is a period of readout scan in which a short-time signal is read from the pixels 12 in each row. In FIG. 5, a period from readout of a short-time signal to readout of a long-time signal in the pixels 12 in the first row is illustrated as a period TL. In the period TL, a predetermined exposure time is set for each area.

In this manner, the long-time signal and the short-time signal read out from the imaging element 100 are input to the pre-processing unit 210 of the signal processing unit 200. The pre-processing unit 210 performs predetermined pre-processing on each of the long-time signal and the short-time signal, transmits the processed long-time signal to the long-time signal holding unit 220, and transmits the processed short-time signal to the exposure time decision processing unit 240 and the short-time signal holding unit 230.

During the period from the time T41 to the time T43 in which the readout scan of the short-time signal is performed in the area 18a, the decision process of the exposure time in the area 18a is performed in parallel with the readout scan. The exposure time decision processing unit 240 decides the exposure time of the pixel 12 in the area 18a using the data acquired from the pixel 12 in the area 18a, and holds the exposure time in the exposure time information holding unit 250 as the exposure time information of the area 18a.

The vertical scanning circuit 20 performs shutter scan of the area 18a based on the exposure time information of the area 18a held in the exposure time information holding unit 250. That is, the vertical scanning circuit 20 starts shutter scan of the area 18a so that the exposure time of each pixel 12 of the area 18a matches the exposure time information held in the exposure time information holding unit 250. Here, it is assumed that the shutter operation of the pixels 12 in the first row is started at the time T45. The shutter operation of the pixels 12 from the second row to the fourth row is sequentially performed at a predetermined interval for each row, similarly to the readout scan. A period from the time T45 to the time T48 is a period during which shutter scan of the area 18a is performed. In this case, in each pixel 12 of the area 18a, the exposure time for the long-time signal is a time corresponding to the length of the period from the time T45 to the time T50.

In addition, during the period from the time T44 to the time T46 in which the readout scan of the short-time signal is performed in the area 18b, the decision process of the exposure time in the area 18b is performed in parallel with the readout scan. The exposure time decision processing unit 240 decides the exposure time of the pixel 12 in the area 18b using the data acquired from the pixel 12 in the area 18b, and holds the exposure time in the exposure time information holding unit 250 as the exposure time information of the area 18b.

The vertical scanning circuit 20 performs shutter scan of the area 18b based on the exposure time information of the area 18b held in the exposure time information holding unit 250. That is, the vertical scanning circuit 20 starts shutter scan of the area 18b so that the exposure time of each pixel 12 of the area 18b matches the exposure time information held in the exposure time information holding unit 250. Here, it is assumed that the shutter operation of the pixels 12 in the fifth row is started at the time T49. The shutter operation of the pixels 12 in the sixth row and the seventh row is sequentially performed at a predetermined interval for each row, similarly to the readout scan. A period from the time T49 to the time T51 is a period during which shutter scan of the area 18b is performed. In this case, in each pixel 12 of the area 18b, the exposure time for the long-time signal is a time corresponding to the length of the period from the time T49 to the time T52.

In addition, during a period from the time T47 to the time T50 in which the readout scan of the short-time signal is performed in the area 18c, the decision process of the exposure time in the area 18c is performed in parallel with the readout scan. The exposure time decision processing unit 240 decides the exposure time of the pixel 12 in the area 18c using the data acquired from the pixel 12 in the area 18c, and holds the exposure time in the exposure time information holding unit 250 as the exposure time information of the area 18c.

The vertical scanning circuit 20 performs shutter scan of the area 18c based on the exposure time information of the area 18c held in the exposure time information holding unit 250. That is, the vertical scanning circuit 20 starts shutter scan of the area 18c so that the exposure time of each pixel 12 of the area 18c matches the exposure time information held in the exposure time information holding unit 250. Here, it is assumed that the shutter scan of the area 18c is not performed in response to the decision that the exposure time is maximum by the exposure time decision processing unit 240. In this case, in each pixel 12 of the area 18c, the exposure time for the long-time signal is equivalent to the length of the period obtained by subtracting the exposure time for the short-time signal from the period of one frame.

Figure 6:
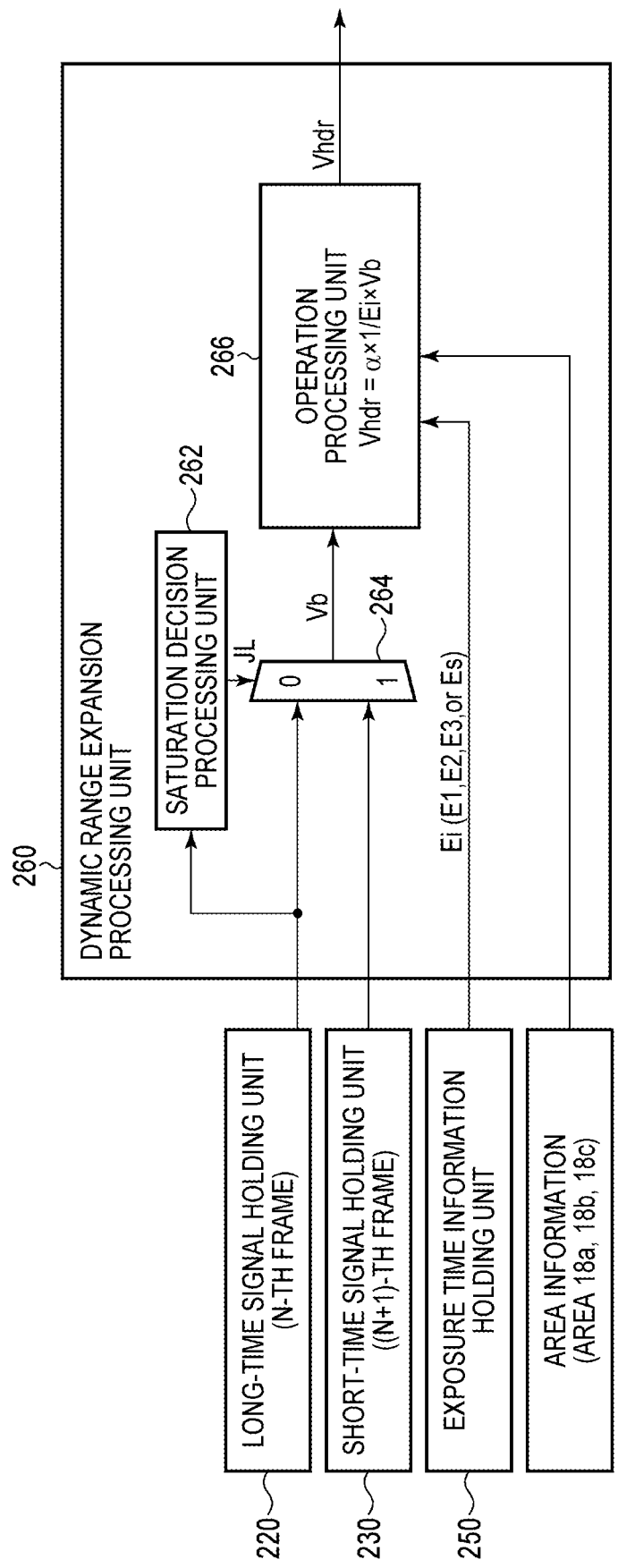
FIG. 6 is a diagram illustrating a configuration and an operation of a dynamic range expansion processing unit in the imaging device according to the first embodiment of the present invention.
Figure 7:
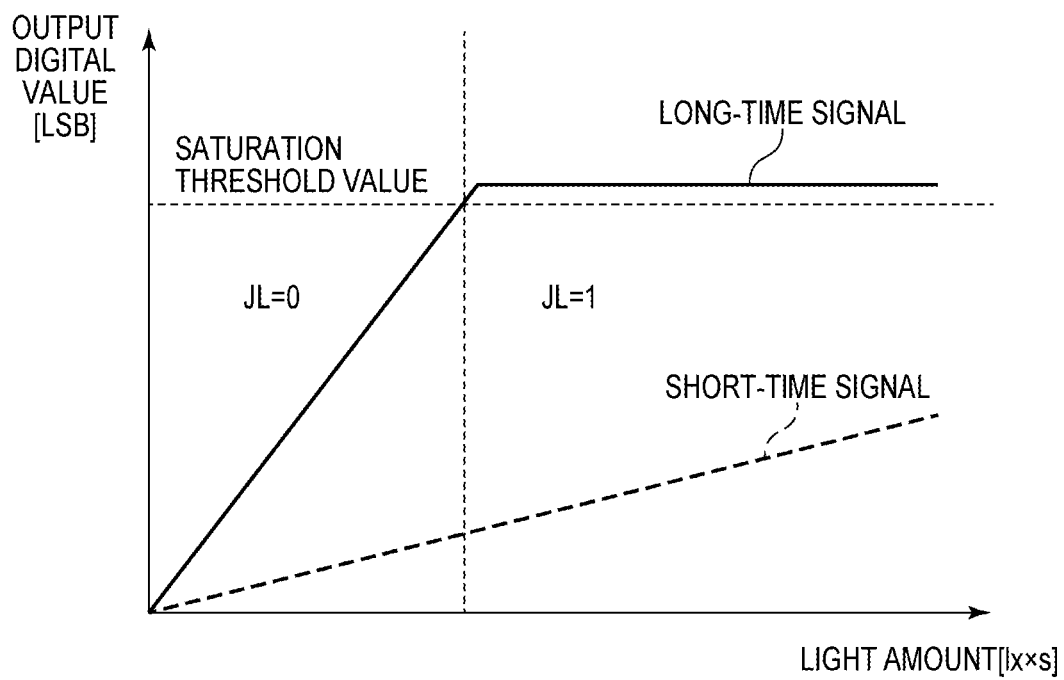
FIG. 7 is a graph illustrating a relationship between an amount of incident light to a pixel and an output value from the imaging element.

Next, a configuration example and an operation of the dynamic range expansion processing unit 260 in the imaging device 400 of the present embodiment will be described with reference to FIG. 6 and FIG. 7. FIG. 6 is a diagram illustrating the configuration and operation of the dynamic range expansion processing unit 260. FIG. 7 is a graph illustrating the relationship between the amount of incident light to the pixel 12 and the output value from the imaging element 100.

As illustrated in FIG. 6, for example, the dynamic range expansion processing unit 260 may include a saturation decision processing unit 262, a selector 264, and an operation processing unit 266. The selector 264 is connected to the long-time signal holding unit 220 and the short-time signal holding unit 230. The saturation decision processing unit 262 is connected to the long-time signal holding unit 220 and the selector 264. The operation processing unit 266 is connected to the selector 264 and the exposure time information holding unit 250.

The saturation decision processing unit 262 is supplied with the long-time signal of the N-th frame held by the long-time signal holding unit 220. The saturation decision processing unit 262 compares the data of the long-time signal received from the long-time signal holding unit 220 with a preset saturation threshold value. Here, the saturation threshold value is a reference value for deciding whether or not the output signal is saturated. As a result of the comparison, when the value of the data of the long-time signal exceeds the saturation threshold value, the saturation decision processing unit 262 outputs the saturation decision signal JL of high level ("1") to the selector 264. As a result of the comparison, when the value of the data of the long-time signal is equal to or less than the saturation threshold value, the saturation decision processing unit 262 outputs the saturation decision signal JL of low level ("0") to the selector 264.

The selector 264 is supplied with the long-time signal of the N-th frame held by the long-time signal holding unit 220 and the short-time signal of the (N+1)-th frame held by the short-time signal holding unit 230. The selector 264 outputs one of the long-time signal of the N-th frame received from the long-time signal holding unit 220 and the short-time signal of the (N+1)-th frame received from the short-time signal holding unit 230 as the output value Vb in response to the saturation decision signal JL received from the saturation decision processing unit 262. Specifically, the selector 264 outputs a short-time signal of the (N+1)-th frame as the output value Vb when the saturation decision signal JL is at a high level ("1"), and outputs a long-time signal of the N-th frame as the output value Vb when the saturation decision signal JL is at a low level ("0").

The operation processing unit 266 is supplied with the output value Vb of the selector 264 and area information indicating from which area the signal supplied from the selector 264 is acquired. The operation processing unit 266 calculates and outputs the output value Vhdr using the output value Vb received from the selector 264, the exposure time information Ei received from the exposure time information holding unit 250, and the area information. The output value Vhdr is calculated based on the following Equation (2). In the Equation (2), a variable α is a predetermined coefficient for performing bit extension.

$$Vhdr = \alpha \times (1/Ei) \times Vb \quad (2)$$

As illustrated in FIG. 7, the signal levels of the long-time signal and the short-time signal increase as the amount of incident light on the pixel 12 increases. When the amount of signal charge generated by the photodiode PD exceeds the upper limit (saturation charge amount) of the amount of charge that may be accumulated in the photodiode PD, the signal level is saturated. A long-time signal in which the accumulation time of the signal charge is relatively longer than that of a short-time signal is saturated with a smaller amount of light than a short-time signal because the signal level in the same amount of light is larger than that of a short-time signal.

Therefore, the saturation decision processing unit 262 performs saturation decision of the long-time signal, and when the long-time signal is saturated, the output value Vhdr is calculated using the short-time signal, and when the long-time signal is not saturated, the output value Vhdr is calculated using the long-time signal. The saturation threshold value used for the saturation decision of the long-time signal may be set to a signal level slightly lower than the output signal level corresponding to the saturation charge amount of the photodiode PD, for example, as illustrated in FIG. 7.

The exposure time information Ei includes exposure times E1, E2, and E3 for the long-time signal and the exposure time Es for the short-time signal. When the long-time signal of the pixel 12 arranged in the area 18a is selected by the selector 264, the exposure time E1 for the long-time signal in the area 18a is applied to the exposure time information Ei in the Equation (1). When the long-time signal of the pixel 12 arranged in the area 18b is selected by the selector 264, the exposure time E2 for the long-time signal in the area 18b is applied to the exposure time information Ei in the Equation (1). When the long-time signal of the pixel 12 arranged in the area 18c is selected by the selector 264, the exposure time E3 for the long-time signal in the area 18c is applied to the exposure time information Ei in the Equation (1). When the short-time signal is selected by the selector 264, the exposure time Es for the short-time signal is applied to the exposure time information Ei in the Equation (1).

By normalizing the output value Vb with the exposure time information Ei, the relationship between the incident light amount and the output value Vhdr may be linearized regardless of the signal selected by the selector 264. In other words, the dynamic range expansion processing unit 260 is a signal processing unit that performs correction processing on the output value Vb with a weight proportional to the reciprocal of the length of the exposure period and outputs the result as the output value Vhdr.

In the imaging device 400 of the present embodiment, line interleave readout is used, and readout of the long-time signal and readout of the short-time signal alternately performed on a row basis in the order of the areas 18a, 18b, and 18c. Thus, the decision of the exposure time in the area 18a is completed before the readout of the short-time signal for the decision of the exposure time is completed in all the rows, and the shutter scan in the area 18a may be started. In other words, the exposure period of the long-time signal may be started before the readout of the short-time signal for the decision of the exposure time ends in all the rows, and the readout cycle of the long-time signal, that is, the frame rate may be improved. In addition, the interval between the exposure period of the short-time signal and the exposure period of the long-time signal for the exposure time decision may be narrowed, and the accuracy of the exposure time decision may be improved.

As described above, according to the present embodiment, a high quality and high dynamic range image may be acquired without impairing the frame rate.

Second Embodiment

An imaging device according to a second embodiment of the present invention will be described with reference to FIG. 8 to FIG. 11. The same components as those of the imaging device according to the first embodiment are denoted by the same reference numerals, and the description thereof will be omitted or simplified.

Figure 8:
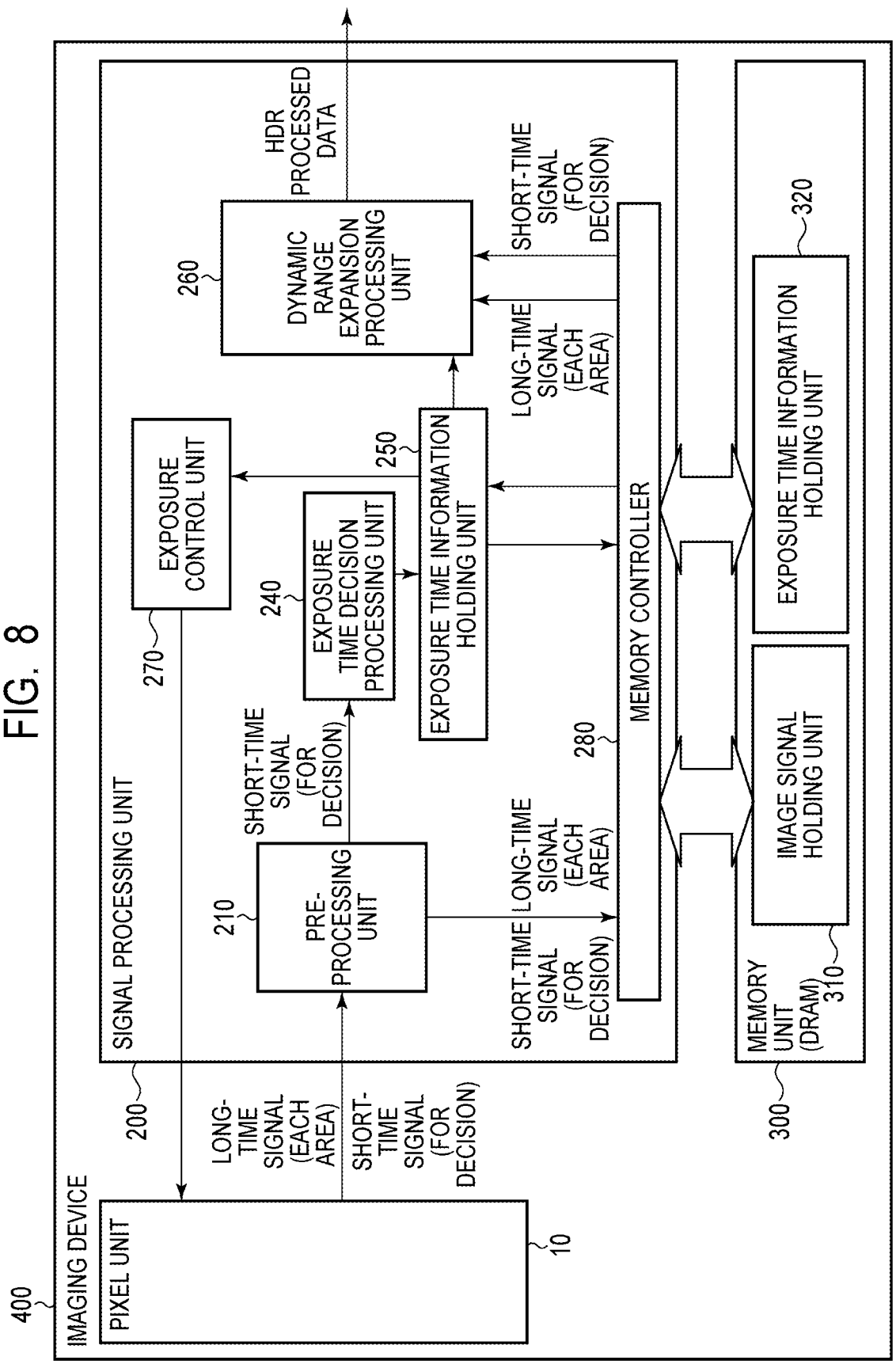
FIG. 8 is a block diagram illustrating a general configuration of an imaging device according to a second embodiment of the present invention.
Figure 9:
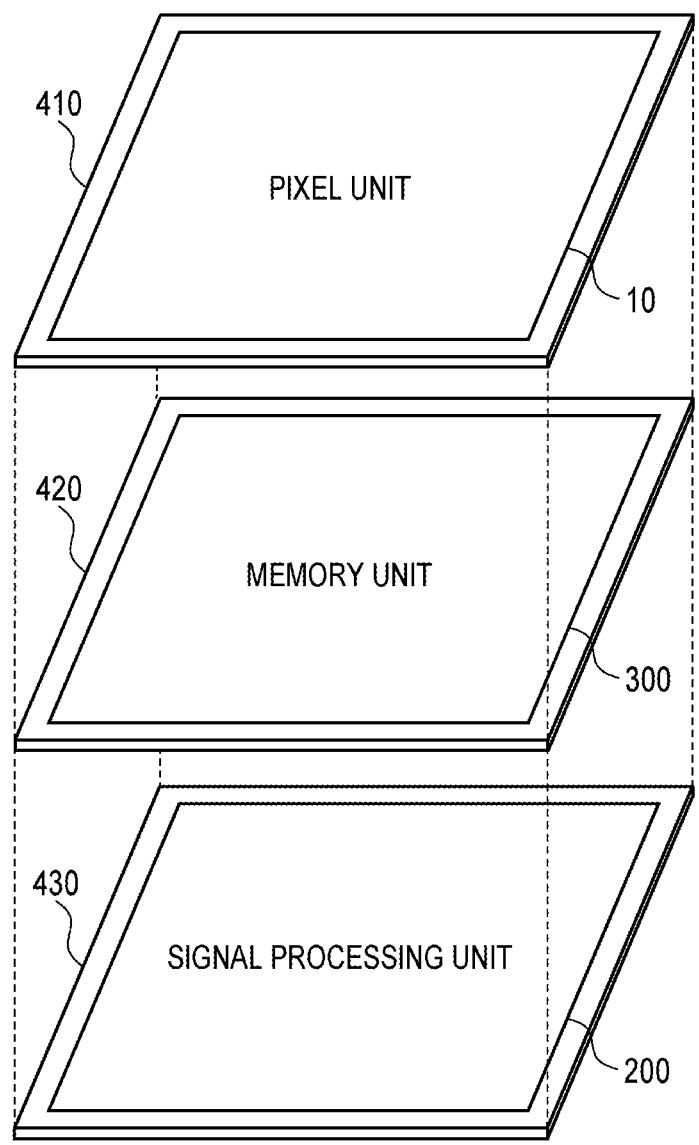
FIG. 9 is a perspective view schematically illustrating the imaging device according to the second embodiment of the present invention.

First, a configuration example of the imaging device according to the present embodiment will be described with reference to FIG. 8 and FIG. 9. FIG. 8 is a block diagram illustrating a general configuration of the imaging device according to the present embodiment. FIG. 9 is a perspective view schematically illustrating the imaging device according to the present embodiment.

In the first embodiment, a configuration example in which a plurality of areas 18a, 18b, and 18c defined by rows of the pixel array are defined as the adjustment area of the exposure time has been described. In the present embodiment, a configuration example in which the adjustment area of the exposure time is defined for each pixel 12 will be described focusing on points different from the first embodiment.

As illustrated in FIG. 8, the imaging device 400 according to the present embodiment may include a pixel unit 10, a signal processing unit 200, and a memory unit 300. The signal processing unit 200 may include a pre-processing unit 210, an exposure time decision processing unit 240, an exposure time information holding unit 250, a dynamic range expansion processing unit 260, an exposure control unit 270, and a memory controller 280. The memory unit 300 may include an image signal holding unit 310 and an exposure time information holding unit 320.

The pixel unit 10 is basically the same as the pixel unit 10 of the imaging element 100 in the first embodiment. Although details are omitted in FIG. 8 for simplicity, functional blocks other than the pixel unit 10 of the imaging element 100 in the first embodiment may be included in the signal processing unit 200 or the like. For example, the function of the vertical scanning circuit 20 may be provided by the exposure control unit 270. At least a part of the functions of the readout circuit unit 30, the memory unit 40, the counter 46, the horizontal scanning circuit 50, the signal output unit 60, and the timing generation circuit 70 may be regarded as a part of the functions of the pre-processing unit 210.

The pixel unit 10 of the present embodiment differs from the pixel unit 10 of the first embodiment in that the plurality of pixels 12 constituting the pixel unit 10 are configured to be capable of controlling the exposure time in pixel basis, not in pixel row basis. That is, among the plurality of signal lines constituting the control line 14 arranged in each row of the pixel unit 10, at least a plurality of signal lines for supplying the control signal ϕTX and a plurality of signal lines for supplying the control signal ϕRES are provided to the pixels 12 in each column.

The pre-processing unit 210 performs pre-processing similar to that of the first embodiment on each of the long-time signal and the short-time signal output from the pixel unit 10, separates the processed long-time signal and short-time signal, and transmits them to the subsequent processing unit. Specifically, the pre-processing unit 210 transmits the processed short-time signal to the exposure time decision processing unit 240, and transmits the processed longtime signal and short-time signal to the image signal holding unit 310 of the memory unit 300 via the memory controller 280. The image signal holding unit 310 holds the long-time signal and the short-time signal received from the pre-processing unit 210 as image signals.

The exposure time decision processing unit 240 performs an exposure time decision process on the short-time signal received from the pre-processing unit 210, and decides the timing of shutter scan for deciding the exposure time for the long-time signal. The exposure time decision processing unit 240 transmits information (exposure time information) related to the exposure time for the long-time signal decided by the decision of the short-time signal to the exposure time information holding unit 250 as a cache memory. The exposure time information holding unit 250 temporarily holds the exposure time information received from the exposure time decision processing unit 240. The exposure time information holding unit 250 transmits and receives exposure time information to and from the exposure time information holding unit 320 of the memory unit 300 via the memory controller 280. The exposure time information holding unit 320 holds the exposure time information received from the exposure time information holding unit 250.

The exposure control unit 270 controls shutter scan and readout scan of the pixels 12 arranged in the pixel unit 10 based on the exposure time information held in the exposure time information holding unit 250 and the vertical scanning information of each area. In the present embodiment, the exposure control unit 270 is a pixel control unit that controls the plurality of pixels 12 so as to output a short-time signal and a long-time signal from each of the plurality of pixels 12.

The dynamic range expansion processing unit 260 performs processing for obtaining image data having a wide dynamic range using the image signal held in the image signal holding unit 310 of the memory unit 300 and the exposure time information held in the exposure time information holding unit 250. The basic configuration and operation of the dynamic range expansion processing unit 260 are the same as those of the first embodiment.

The imaging device 400 according to the present embodiment may be configured as a stacked image sensor in which a plurality of substrates are stacked. For example, as illustrated in FIG. 9, the imaging device 400 may include a pixel substrate 410, a memory substrate 420, and a processing circuit substrate 430. At least the pixel unit 10 of the functional blocks illustrated in FIG. 8 is arranged on the pixel substrate 410. The image signal holding unit 310 and the exposure time information holding unit 320, which constitute the memory unit 300, may be disposed on the memory substrate 420. The processing circuit substrate 430 may include the pre-processing unit 210, the exposure time decision processing unit 240, the exposure time information holding unit 250, the dynamic range expansion processing unit 260, the exposure control unit 270, and the memory controller 280, which constitute the signal processing unit 200. The arrangement of the functional blocks is not limited to the above-described example.

Figure 10:
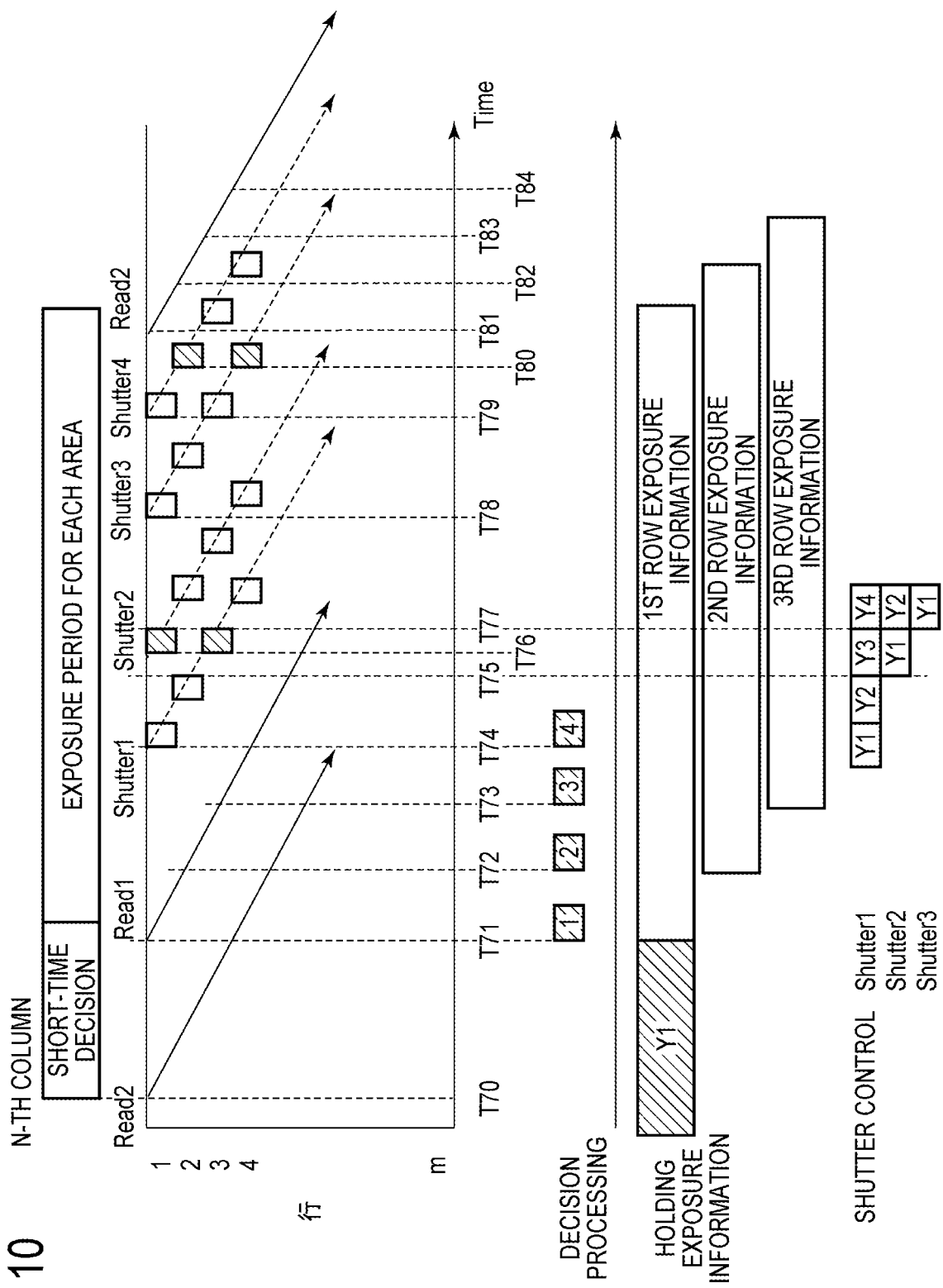
FIG. 10 is a timing chart illustrating an operation of the imaging device according to the second embodiment of the present invention.
Figure 11:
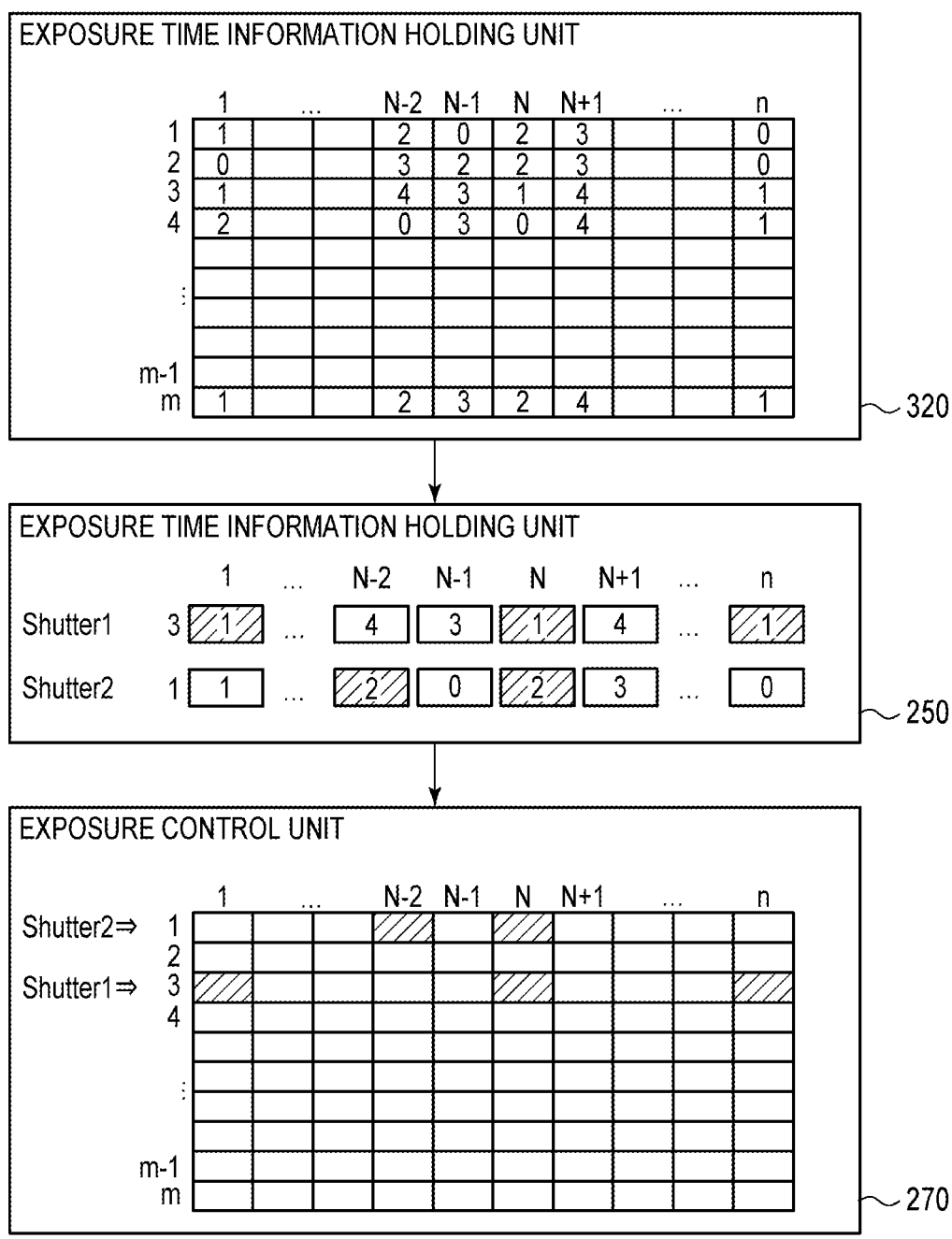
FIG. 11 is a diagram illustrating details of a shutter control in the imaging device according to the second embodiment of the present invention.

Next, the operation of the imaging device 400 according to the present embodiment will be described with reference to FIG. 10 and FIG. 11. FIG. 10 is a timing chart illustrating the operation of the imaging device according to the present embodiment. FIG. 11 is a diagram illustrating details of a shutter control in the imaging device according to the present embodiment.

FIG. 10 illustrates the operation timing of the pixel 12 in the N-th column among the plurality of pixel columns including the first column to the n-th column (N is an integer of 1 to n). In FIG. 10, "Read1" indicates the timing of readout scan of the short-time signal, and "Read2" indicates the timing of readout scan of the long-time signal. "Shutter1", "Shutter2", "Shutter3", and "Shutter4" indicate shutter scan timings. Focusing on the pixels 12 in the first row, shutter scans Shutter1, Shutter2, Shutter3, and Shutter4 start at times T74, T76, T78, and T79, respectively. In this example, the shutter scan timing is fixed in four patterns, and the exposure time of each pixel 12 including the effective/ ineffective shutter operation may be set in five patterns. In this example, while the shutter scan timing is four patterns, the shutter scan timing is not limited to four patterns.

First, refer to the pixels 12 in the first row.

At the time T70, the readout operation of the long-time signal based on the charge accumulated during the exposure period of the previous frame is performed in accordance with the readout scan Read2.

At a subsequent time T71, a signal (short-time signal) based on the charge accumulated between the time T70 and the time T71 is read in accordance with the readout scan Read1. The length of the period from the time T70 to the time T71 is the exposure time for the short-time signal. The exposure time decision processing unit 240 decides the exposure time for the long-time signal in the pixel 12 based on the short-time signal acquired from the pixel 12 in the first row. Here, it is assumed that it is decided that the shutter operation is performed at the timing of the shutter scan Shutter2 on the pixels 12 in the first row and the N-th column as a result of the decision. The decision result is held in the exposure time information holding unit 320 via the exposure time information holding unit 250 and the memory controller 280 as the exposure time information of the pixel 12.

At a subsequent time T76, the exposure control unit 270 performs the shutter operation (shutter scan Shutter2) on the pixels 12 in the first row and the N-th column based on the information held in the exposure time information holding unit 320.

At a subsequent time T81, a signal (long-time signal) based on the charge accumulated between the time T76 and the time T81 is read in accordance with the readout scan Read2. The length of the period from the time T74 to the time T80 is the exposure time for the long-time signal in the pixels 12 in the first row and the N-th column.

Next, refer to the pixels 12 in the second row.

A short-time signal is read from the pixels 12 in the second row at the time T72 after the time T71 in accordance with the readout scan Read1. The exposure time decision processing unit 240 decides the exposure time for the long-time signal in the pixel 12 based on the short-time signal acquired from the pixel 12 in the second row. Here, it is assumed that it is decided that the shutter operation is performed on the pixels 12 in the second row and the N-th column at the timing of the shutter scan Shutter4 as a result of the decision. The decision result is held in the exposure time information holding unit 320 via the exposure time information holding unit 250 and the memory controller 280 as the exposure time information of the pixel 12.

At a subsequent time T80, the exposure control unit 270 performs the shutter operation (shutter scan Shutter4) on the pixels 12 in the second row and the N-th column based on the information held in the exposure time information holding unit 320.

At a subsequent time T82, a signal (long-time signal) based on the charge accumulated between the time T80 and the time T82 is read in accordance with the readout scan Read2. The length of the period from the time T80 to the time T82 is the exposure time for the long-time signal in the pixels 12 in the second row and the N-th column.

Next, refer to the pixels 12 in the third row.

A short-time signal is read from the pixels 12 in the third row at a time T73 after the time T72 in accordance with the readout scan Read1. The exposure time decision processing unit 240 decides the exposure time for the long-time signal in the pixel 12 based on the short-time signal acquired from the pixel 12 in the third row. Here, it is assumed that it is decided that the shutter operation is performed at the timing of the shutter scan Shutter1 on the pixels 12 in the third row and the N-th column as a result of the decision. The decision result is held in the exposure time information holding unit 320 via the exposure time information holding unit 250 and the memory controller 280 as the exposure time information of the pixel 12.

At a subsequent time T76, the exposure control unit 270 performs the shutter operation (shutter scan Shutter1) on the pixels 12 in the third row and the N-th column based on the information held in the exposure time information holding unit 320.

At a subsequent time T83, a signal (long-time signal) based on the charge accumulated between the time T76 and the time T83 is read in accordance with the readout scan Read2. The length of the period from the time T76 to the time T83 is the exposure time for the long-time signal in the pixels 12 in the third row and the N-th column.

Next, refer to the pixels 12 in the fourth row.

With respect to the pixels 12 in the fourth row, a short-time signal is read at a time T74 after the time T73 in accordance with the readout scan Read1. The exposure time decision processing unit 240 decides the exposure time for the long-time signal in the pixel 12 based on the short-time signal acquired from the pixel 12 in the fourth row. Here, as a result of the decision, it is assumed that it is decided that the shutter operation is performed on the pixels 12 in the fourth row and the N-th column at the timing of the shutter scan Shutter3. The decision result is held in the exposure time information holding unit 320 via the exposure time information holding unit 250 and the memory controller 280 as the exposure time information of the pixel 12.

At a subsequent time T80, the exposure control unit 270 performs the shutter operation (shutter scan Shutter3) on the pixels 12 in the fourth row and the N-th column based on the information held in the exposure time information holding unit 320.

At a subsequent time T84, a signal (long-time signal) based on the charge accumulated between the time T80 and the time T84 is read in accordance with the readout scan Read2. The length of the period from the time T80 to the time T84 is the exposure time for the long-time signal in the pixels 12 in the fourth row and the N-th column.

In the readout scan Read2 and the next readout scan Read1, similarly to the imaging element 100 of the first embodiment, the line interleaving driving is performed in which the readout operation of the long-time signal and the readout operation of the short-time signal are alternately performed on a row-by-row basis. In the example of FIG. 10, for example, the readout operation (Read2) of the pixels 12 in the fifth row is performed between the time T72 and the time T73, and the readout operation (Read2) of the pixels 12 in the sixth row is performed between the time T73 and the time T74.

Next, details of the shutter control will be described with reference to FIG. 11 by referring to an operation in a period from the time T76 to the time T77 as an example.

When the readout scan Read1 is started at the time T71, the exposure time decision processing unit 240 sequentially performs decision processing for defining the exposure time for the long-time signal on the short-time signal output from the pixel unit 10. The decision result by the exposure time decision processing unit 240 is held in the exposure time information holding unit 320 via the exposure time information holding unit 250 and the memory controller 280 as information (exposure time information) representing the exposure time for the long-time signal. For example, the decision process of the pixels 12 in the first row is started at the time T71, and exposure time information corresponding to the decision result is held in the exposure time information holding unit 320. The decision process of the pixels 12 in the second row is started at the time T72, and exposure time information corresponding to the decision result is held in the exposure time information holding unit 320. The decision process of the pixels 12 in the third row is started at the time T73, and exposure time information corresponding to the decision result is held in the exposure time information holding unit 320. The decision process of the pixels 12 in the fourth row is started at the time T74, and exposure time information corresponding to the decision result is held in the exposure time information holding unit 320.

The information representing the exposure time for the long-time signal is not particularly limited, but may be represented by a numerical value associated with the timing of the shutter operation, for example. In FIG. 11, the case where the shutter operation is performed at the timing of shutter scans Shutter1, Shutter2, Shutter3, and Shutter4 is represented by "1", "2", "3", and "4", respectively. Further, "0" represents a case where the shutter operation is not performed at any timing of shutter scans Shutter1, Shutter2, Shutter3 and Shutter4. Here, it is assumed that the first column of the first row is "1", the (N−2)-th column and the N-th column of the first row are "2", the (N+1)-th column of the first row is "3", and the (N−1)-th column and the n-th column of the first row are "0". Further, it is assumed that the first column, the N-th column, and the n-th column of the third row are "1", the (N−1)-th column is "3", and the (N−2)-th column and the (N+1)-th column are "4".

At the time T76, as illustrated in FIG. 10, the shutter scan Shutter2 is performed for the first row, and the shutter scan Shutter1 is performed for the third row. The exposure time information holding unit 250 as a cache memory of the exposure time information holding unit 320 loads, from the exposure time information holding unit 320, the exposure time information of each pixel 12 in the third row as the exposure time information for the shutter scan Shutter1. The exposure time information holding unit 250 loads the exposure time information of each pixel 12 in the first row as the exposure time information for the shutter scan Shutter2. The exposure time information holding unit 250 refers to the exposure time information loaded for the shutter scan Shutter1, generates an enable signal for permitting the shutter scan Shutter1 for a column in which the exposure time information is "1", and outputs the enable signal to the exposure control unit 270. In the example of FIG. 11, the enable signal of the shutter scan Shutter1 is output to the first column, the N-th column, and the n-th column. Further, the exposure time information holding unit 250 refers to the exposure time information loaded for the shutter scan Shutter2, generates an enable signal for permitting the shutter scan Shutter2 for a column in which the exposure time information is "2", and outputs the enable signal to the exposure control unit 270. In the example of FIG. 11, the enable signal of the shutter scan Shutter2 is output to the (N−2)-th column and the N-th column.

The exposure control unit 270 supplies shutter pulses to the corresponding pixels 12 based on the enable signal received from the exposure time information holding unit 250. In the example of FIG. 11, the shutter pulses are supplied from the exposure control unit 270 to the pixels 12 in the (N−2)-th column and the N-th column of the first row and the pixels 12 in the first column, the N-th column, and the n-th column of the third row. Thus, the exposure time of each of the pixels 12 included in the pixel unit 10 may be controlled.

In the imaging device 400 of the present embodiment, as in the first embodiment, the line interleave readout is used, and the readout of the long-time signal and the readout of the short-time signal are alternately performed row-by-row basis. As a result, before the readout of the short-time signal for the decision of the exposure time is completed in all the rows, it is possible to complete the decision of the exposure time in the row in which the readout is completed earlier, and it is possible to start the shutter scan for these rows. In other words, the exposure period of the long-time signal may be started before the readout of the short-time signal for the decision of the exposure time ends in all the rows, and the readout cycle of the long-time signal, that is, the frame rate may be increased. Further, in the present embodiment, since the exposure time is controlled for each pixel, the exposure time control may be precise, and the dynamic range may be further expanded.

As described above, according to the present embodiment, a high-quality and wide-dynamic range image may be acquired without impairing the frame rate.

Third Embodiment

An imaging system according to a third embodiment of the present invention will be described with reference to FIG. 12. FIG. 12 is a block diagram illustrating a general configuration of an imaging system according to the present embodiment.

The imaging device 400 described in the first and second embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 12 is a block diagram of a digital still camera.

The imaging system 500 illustrated in FIG. 12 includes an imaging device 501, a lens 502 for forming an optical image of an object on the imaging device 501, an aperture 504 for varying the amount of light passing through the lens 502, and a barrier 506 for protecting the lens 502. The lens 502 and the aperture 504 are optical systems for focusing light on the imaging device 501. The imaging device 501 is the imaging device 400 described in any of the first and second embodiments, and converts an optical image formed by the lens 502 into image data.

The imaging system 500 also includes a signal processing unit 508 that processes an output signal output from the imaging device 501. The signal processing unit 508 is a signal processing apparatus that generates image data from a digital signal output from the imaging device 501. The signal processing unit 508 performs various types of correction and compression as necessary, and outputs image data. The imaging device 501 may include an AD conversion unit that generates a digital signal to be processed by the signal processing unit 508. The AD conversion unit may be formed on a semiconductor layer (semiconductor substrate) on which the photoelectric converter of the imaging device 501 is formed, or may be formed on a semiconductor substrate different from the semiconductor layer on which the photoelectric converter of the imaging device 501 is formed. The signal processing unit 508 may be formed on the same semiconductor substrate as the imaging device 501.

The imaging system 500 further includes a memory 510 for temporarily storing image data, and an external interface unit (external I/F unit) 512 for communicating with an external computer or the like. The imaging system 500 further includes a storage medium 514 such as a semiconductor memory for storing or reading imaging data, and a storage medium control interface unit (storage medium control I/F unit) 516 for storing or reading imaging data on or from the storage medium 514. The storage medium 514 may be provided in the imaging system 500 or may be detachable.

The imaging system 500 further includes a general control/operation unit 518 that controls various calculations and the whole digital still camera, and a timing generation unit 520 that outputs various timing signals to the imaging device 501 and the signal processing unit 508. Here, the timing signal or the like may be input from the outside, and the imaging system 500 may include at least the imaging device 501 and the signal processing unit 508 that processes the output signal output from the imaging device 501.

The imaging device 501 outputs an imaging signal to the signal processing unit 508. The signal processing unit 508 performs predetermined signal processing on an imaging signal output from the imaging device 501, and outputs image data. The signal processing unit 508 generates an image using the imaging signal.

As described above, according to the present embodiment, the imaging system to which the imaging device 400 according to the first and second embodiments is applied may be realized.

Fourth Embodiment

Figure 13A:
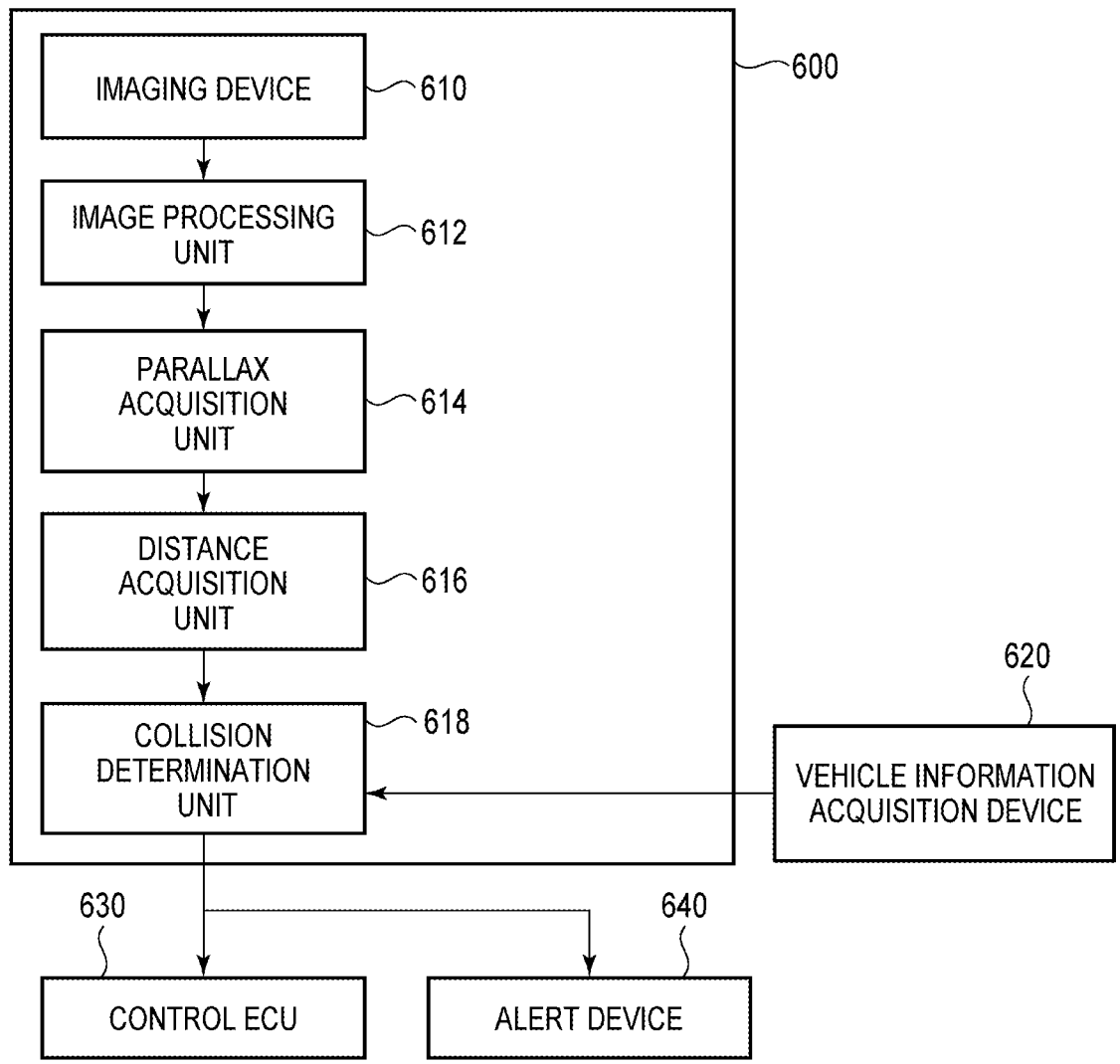
FIG. 13A is a diagram illustrating a configuration example of an imaging system according to a fourth embodiment of the present invention.
Figure 13B:
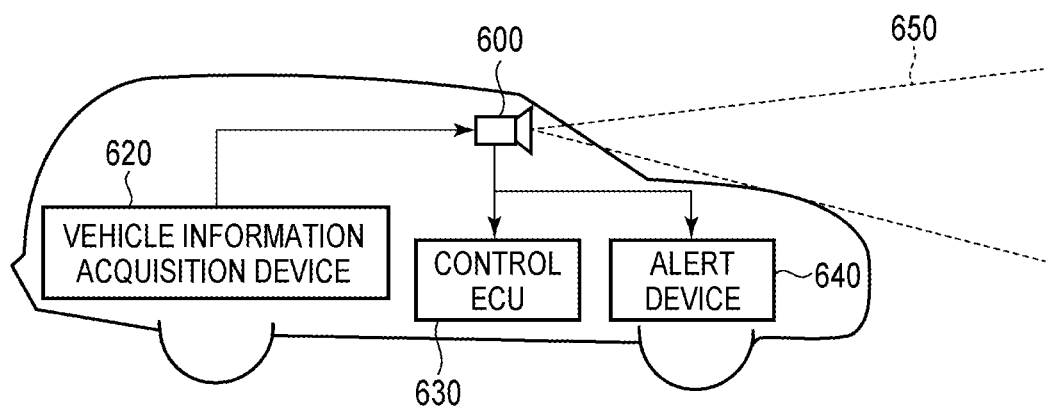
FIG. 13B is a diagram illustrating a configuration example of a movable object according to the fourth embodiment of the present invention.

An imaging system and a moving object according to a fourth embodiment of the present invention will be described with reference to FIG. 13A and FIG. 13B. FIG. 13A is a diagram illustrating a configuration of an imaging system according to the present embodiment. FIG. 13B is a diagram illustrating a configuration of a moving body according to the present embodiment.

FIG. 13A illustrates an example of an imaging system related to an on-vehicle camera. The imaging system 600 includes an imaging device 610. The imaging device 610 is the imaging device 400 according to any one of the first and second embodiments. The imaging system 600 includes an image processing unit 612 that performs image processing on a plurality of image data acquired by the imaging device 610, and a parallax acquisition unit 614 that calculates parallax (phase difference of parallax images) from the plurality of image data acquired by the imaging system 600. The imaging system 600 includes a distance acquisition unit 616 that calculates a distance to the object based on the calculated parallax, and a collision determination unit 618 that determines whether there is a possibility of collision based on the calculated distance. Here, the parallax acquisition unit 614 and the distance acquisition unit 616 are an example of a distance information acquisition unit that acquires distance information to an object. That is, the distance information is information related to parallax, defocus amount, distance to an object, and the like. The collision determination unit 618 may determine the possibility of collision using any of the distance information. The distance information acquisition means may be implemented by dedicatedly designed hardware, or may be implemented by a software module. It may be implemented by FPGA (Field Programmable Gate Array), ASIC (Application Specific Integrated circuit), or the like, or may be implemented by a combination thereof.

The imaging system 600 is connected to the vehicle information acquisition device 620, and may acquire vehicle information such as a vehicle speed, a yaw rate, and a steering angle. Further, the imaging system 600 is connected to a control ECU 630, which is a control device that outputs a control signal for generating braking force to the vehicle based on the decision result obtained by the collision determination unit 618. The imaging system 600 is also connected to an alert device 640 that issues an alert to the driver based on the determination result of the collision determination unit 618. For example, when the possibility of collision is high as the determination result of the collision determination unit 618, the control ECU 630 performs vehicle control for avoiding collision and reducing damage by applying a brake, returning an accelerator, suppressing engine output, or the like. The alert device 640 sounds an alert such as a sound, displays alert information on a screen of a car navigation system or the like, and applies vibration to a seatbelt or a steering wheel, thereby warning the user.

In this embodiment, the imaging system 600 captures an image of around the vehicle, for example, the front or the rear. FIG. 13B illustrates an imaging system in the case of capturing an image of the front of a vehicle (capturing area 650). The vehicle information acquisition device 620 sends an instruction to the imaging system 600 or the imaging device 610. With such a configuration, the accuracy of distance measurement may be further improved.

Although an example in which the vehicle is controlled so as not to collide with another vehicle has been described above, the present invention is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (moving apparatus) such as a ship, an aircraft, or an industrial robot. In addition, the present invention may be applied not only to a moving body but also to an apparatus using object recognition in a wide range such as an intelligent transport system (ITS).

Modified Embodiments

The present invention is not limited to the above embodiments, and various modifications are possible.

For example, an example in which a configuration of a part of any embodiment is added to another embodiment or an example in which a configuration of a part of another embodiment is substituted is also an embodiment of the present invention.

The first embodiment defines a plurality of areas by rows in the pixel unit 10, and the second embodiment defines a plurality of areas by one pixel 12 in the pixel unit 10. However, the method of defining the area is not limited to these embodiments. For example, a plurality of areas may be defined by columns in the pixel unit 10, or a plurality of pixel blocks each including columns less than n columns and rows less than m rows may be defined in the pixel unit 10.

Although the first and second embodiments exemplify an apparatus for the purpose of acquiring an image, that is, an imaging device, the application example of the present invention is not necessarily limited to the imaging device. For example, in the case where the present invention is applied to an apparatus mainly used for distance measurement as described in the fourth embodiment, it is not always necessary to output an image. In such a case, the device may be a photoelectric conversion device that converts optical information into a predetermined electric signal. The imaging device is one of photoelectric conversion devices.

The imaging systems described in the third and fourth embodiments are examples of imaging systems to which the imaging device of the present invention may be applied, and the imaging systems to which the photoelectric conversion apparatus of the present invention may be applied are not limited to the configurations illustrated in FIG. 12 and FIG. 13A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-157440, filed Sep. 18, 2020 which is hereby incorporated by reference herein in its entirety.

What is claimed is:

1. An imaging device comprising:
    a pixel unit in which a plurality of pixels each including a photoelectric converter are arranged in a plurality of rows and a plurality of columns;
    a pixel control unit configured to control the plurality of pixels to output, from each of the plurality of pixels, a first signal based on a charge generated in the photoelectric converter during a first exposure period and a second signal based on a charge generated in the photoelectric converter during a second exposure period having a length different from that of the first exposure period; and
    an exposure time decision processing unit configured to decide a length of the second exposure period based on the first signal,
    wherein the pixel unit includes a plurality of areas each including at least one pixel,
    wherein the exposure time decision processing unit is configured to decide a length of the second exposure period in each of the plurality of areas based on the first signal in each of the plurality of areas, and wherein the pixel control unit is configured to start the second exposure period in the pixels of a first area of the plurality of areas in one frame after the first signal is output from the pixels of the first area in the one frame and before the first signal is output from the pixels of a second area of the plurality of areas in the one frame.

2. The imaging device according to claim 1, wherein the pixel control unit is configured to output the first signal and the second signal of the plurality of pixels for each row of the pixel unit.

3. The imaging device according to claim 2, wherein the pixel control unit is configured to alternately output the first signal and the second signal on a row-by-row basis in at least a part of the plurality of rows.

4. The imaging device according to claim 1, wherein the pixel control unit is configured to perform shutter scan with respect to each of the plurality of areas at a timing corresponding to exposure time information decided by the exposure time decision processing unit.

5. The imaging device according to claim 1, further comprising a signal processing unit configured to perform a correction process on the second signal with a weight proportional to a reciprocal of a length of the second exposure period.

6. The imaging device according to claim 5, wherein when the second signal is saturated, the signal processing unit performs correction processing on the first signal with a weight proportional to the reciprocal of a length of the first exposure period.

7. The imaging device according to claim 1, further comprising an exposure time information holding unit configured to hold the exposure time information decided by the exposure time decision processing unit.

8. The imaging device according to claim 7, further comprising:
a first substrate on which the pixel unit is provided;
a second substrate on which the exposure time information holding unit is provided; and
a third substrate on which the pixel control unit and the exposure time decision processing unit are provided,
wherein the first substrate, the second substrate, and the third substrate are stacked.

9. The imaging device according to claim 1, wherein each of the plurality of areas is defined by a row of the pixel unit.

10. The imaging device according to claim 1, wherein each of the plurality of areas corresponds to each of the plurality of pixels.

11. The imaging device according to claim 1, wherein the lengths of the first exposure periods in the plurality of areas are the same.

12. The imaging device according to claim 1, wherein, in each of the plurality of areas, a length of the second exposure period is longer than a length of the first exposure period.

13. An imaging system comprising:
the imaging device according to claim 1; and
a signal processing device configured to process a signal output from the imaging device.

14. A movable object comprising:
the imaging device according to claim 1;
a distance information acquisition unit configured to acquire distance information on a distance to an object, from a parallax image based on signals from the imaging device; and
a control unit configured to control the movable object based on the distance information.

* * * * *